United States Patent
Jeong et al.

(10) Patent No.: US 9,452,526 B2
(45) Date of Patent: Sep. 27, 2016

(54) ROBOT CLEANER

(71) Applicant: LG Electronics Inc., Seoul (KR)

(72) Inventors: Jimann Jeong, Seoul (KR); Byounggi Lee, Seoul (KR); Kyuho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 14/096,646

(22) Filed: Dec. 4, 2013

(65) Prior Publication Data

US 2014/0156076 A1     Jun. 5, 2014

(30) Foreign Application Priority Data

Dec. 5, 2012  (KR) .................. 10-2012-0140297

(51) Int. Cl.
| | |
|---|---|
| *B25J 9/00* | (2006.01) |
| *G05D 1/00* | (2006.01) |

(52) U.S. Cl.
CPC .......... *B25J 9/0003* (2013.01); *G05D 1/0016* (2013.01); *G05D 1/0033* (2013.01); *G05D 2201/0203* (2013.01)

(58) Field of Classification Search
CPC ............ G05D 2201/0203; G05D 2201/0215; G05D 2201/0206; G05D 2201/0207; G05D 1/0238; G05D 2201/0208; G05D 2201/0209; A47L 2201/04; A47L 2201/00; A47L 9/009; A47L 11/4061; A47L 2201/022; G06F 19/341

See application file for complete search history.

(56) References Cited

U.S. PATENT DOCUMENTS

| | | | | |
|---|---|---|---|---|
| 5,995,884 A * | 11/1999 | Allen | ............... | G05D 1/0225 180/167 |
| 6,308,114 B1 | 10/2001 | Kim | | |
| 7,047,595 B2 * | 5/2006 | Yoshino | .................. | A47L 5/28 15/319 |
| 7,069,124 B1 * | 6/2006 | Whittaker | ............ | G05D 1/0225 701/28 |
| 7,787,991 B2 * | 8/2010 | Jeung | .................. | G05D 1/0214 15/319 |
| 7,832,048 B2 | 11/2010 | Harwig et al. | | |
| 8,761,933 B2 * | 6/2014 | Olivier, III | ........... | G05D 1/0246 700/245 |
| 8,873,831 B2 * | 10/2014 | Ahn | ...................... | G06T 7/0042 382/153 |
| 2004/0034533 A1 | 2/2004 | Park et al. | | |
| 2004/0255425 A1 | 12/2004 | Arai et al. | | |
| 2006/0273749 A1 * | 12/2006 | Im | ........................ | G05D 1/0225 318/587 |

(Continued)

FOREIGN PATENT DOCUMENTS

| | | |
|---|---|---|
| CN | 1550192 A | 12/2004 |
| CN | 101084817 A | 12/2007 |

(Continued)

*Primary Examiner* — Khoi Tran
*Assistant Examiner* — Ryan Rink
(74) *Attorney, Agent, or Firm* — Dentons US LLP

(57) ABSTRACT

Provided is a robot cleaner. The robot cleaner includes a main body defining an outer appearance of the robot cleaner, a moving unit for moving or rotating the main body, a plurality of receiving units disposed in the main body to receive a user's voice command, and a control unit recognizing a call command occurring direction when the voice command inputted from the plurality of receiving units is a call command. The control unit controls the moving unit so that the main body is moved in the recognized call command occurring direction along the preset detour route.

13 Claims, 12 Drawing Sheets

(56) References Cited

U.S. PATENT DOCUMENTS

| | | | | |
|---|---|---|---|---|
| 2007/0183618 | A1* | 8/2007 | Ishii | H04R 3/12 381/387 |
| 2007/0226949 | A1* | 10/2007 | Hahm | A47L 9/009 15/340.1 |
| 2008/0276407 | A1* | 11/2008 | Schnittman | A47L 11/34 15/319 |
| 2010/0026247 | A1* | 2/2010 | Kim | H02J 7/0044 320/162 |
| 2012/0232697 | A1* | 9/2012 | Lee | G05D 1/0246 700/259 |
| 2013/0030750 | A1* | 1/2013 | Kim | G06N 3/004 702/108 |
| 2013/0124031 | A1* | 5/2013 | Chen | G05D 1/0225 701/23 |
| 2013/0158748 | A1* | 6/2013 | Baillie | G05D 1/0038 701/2 |
| 2014/0095007 | A1* | 4/2014 | Angle | B25J 5/007 701/23 |
| 2014/0207280 | A1* | 7/2014 | Duffley | G05D 1/0016 700/257 |

FOREIGN PATENT DOCUMENTS

| | | |
|---|---|---|
| CN | 201242685 Y | 5/2009 |
| CN | 101446832 | 6/2009 |
| CN | 102722186 A | 10/2012 |
| DE | 102011050357 A1 | 2/2012 |
| EP | 2407075 A2 | 7/2011 |
| JP | 3969973 B2 | 10/1990 |
| JP | 2001154706 A | 6/2001 |
| KR | 1020000066728 A | 11/2000 |
| KR | 20100052383 A | 5/2010 |
| KR | 20110090702 A | 8/2011 |
| KR | 10-2011-0124652 A | 11/2011 |
| KR | 20120033630 A | 4/2012 |
| KR | 1020120114670 A | 10/2012 |
| RU | 2317766 C2 | 2/2008 |
| WO | 0063721 A1 | 10/2000 |
| WO | 2012008702 A2 | 1/2012 |
| WO | 2013019402 A1 | 2/2013 |

* cited by examiner

ROBOT CLEANER

CROSS-REFERENCE TO RELATED APPLICATIONS

The present application claims priority under 35 U.S.C. 119 and 35 U.S.C. 365 to Korean Patent Application No. 10-2012-0140297 (filed on Dec. 5, 2012), which is hereby incorporated by reference in its entirety.

BACKGROUND

Generally, robots have been developed for industry to take charge of a portion of factory automation. In recent years, robots are being expanded in application fields. As a result, medical robots, aerospace robots, and the like are being developed, and also, home robots used in general homes are being manufactured.

Representative examples of the home robots may include robot cleaners. The robot cleaners are a kind of home appliances that suction surrounding dusts or foreign substances while traveling for oneself within a predetermined area to perform cleaning. Such a robot cleaner may include a chargeable battery and an obstacle sensor for avoiding an obstacle while traveling. Thus, the robot cleaner may perform cleaning while traveling for oneself.

SUMMARY

Embodiments provide a robot cleaner.

In one embodiment, a robot cleaner includes: a main body defining an outer appearance of the robot cleaner; a moving unit for moving or rotating the main body; a plurality of receiving units disposed in the main body to receive a user's voice command; and a control unit recognizing a call command occurring direction when the voice command inputted from the plurality of receiving units is a call command, wherein the control unit controls the moving unit so that the main body is moved in the recognized call command occurring direction along a preset detour route when the main body is not rotatable in the call command occurring direction.

In another embodiment, a robot cleaner includes: a main body including a receiving unit; a moving unit for moving the main body; a control unit for controlling the moving unit; a voice recognition unit for analyzing a pattern of a voice command inputted into the receiving unit to detect whether a call command is inputted; a direction detection unit for detecting a direction in which the call command occurs; and a detection unit for determining whether the main body is rotatable in the voice command occurring direction at a position at which the main body is disposed when the voice command occurs, wherein, when the main body is not movable in the voice command occurring direction, the main body controls the moving unit so that the main body is moved in the voice command occurring direction along a detour route (Pd).

In further another embodiment, a method for controlling a robot cleaner includes: receiving a voice command of a user through a receiving unit of the robot cleaner; detecting a direction of a call position at which the voice command occurs; detecting a current position of the robot cleaner; determining whether the robot cleaner is movable from the current position in the direction of the call position along a linear path (PL); moving the robot cleaner in the direction of the call position along a preset detour route when the robot cleaner is not movable along the linear path (PL); and ending the movement of the robot cleaner in the call position direction.

The details of one or more embodiments are set forth in the accompanying drawings and the description below. Other features will be apparent from the description and drawings, and from the claims.

DETAILED DESCRIPTION OF THE EMBODIMENTS

Figure 1:
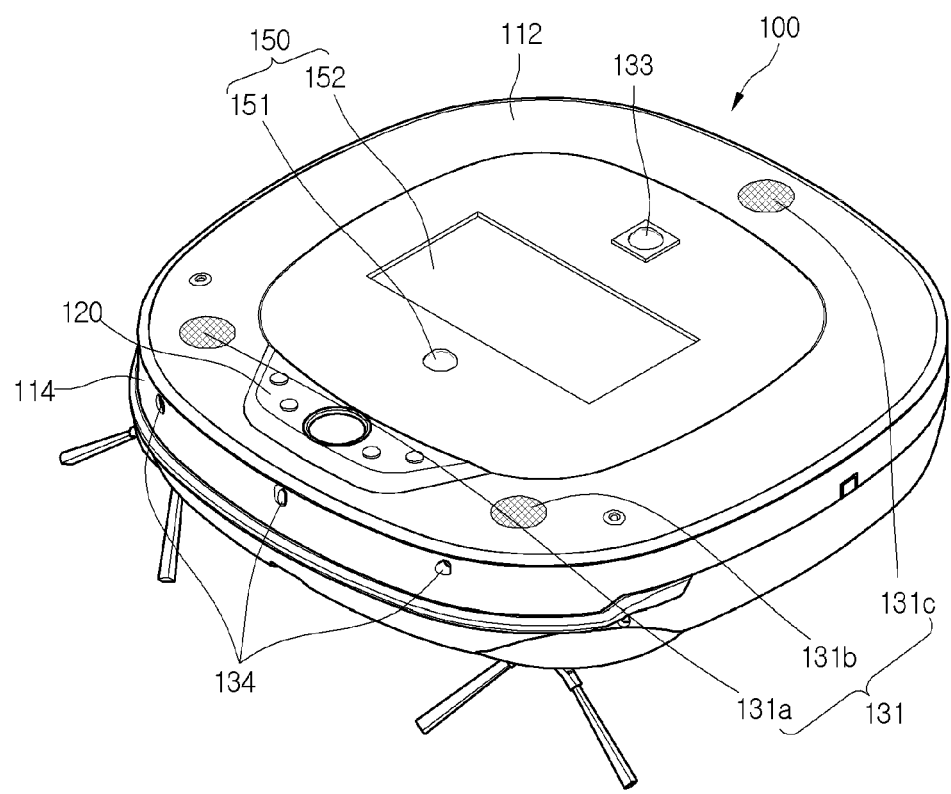
FIG. 1 is a perspective view of a robot cleaner according to a first embodiment.

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Hereinafter, embodiments of the present disclosure will be described with reference to the drawings such that those skilled in the art realize the scope of the inventive concept without difficulties. Moreover, detailed descriptions related to well-known functions or configurations will be ruled out in order not to unnecessarily obscure subject matters of the present disclosure. Here, like reference numerals denote like elements throughout.

In this disclosure below, when one part (or element, device, etc.) is referred to as being 'connected' to another part (or element, device, etc.), it should be understood that the former can be 'directly connected' to the latter, or 'indirectly connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

Figure 2:
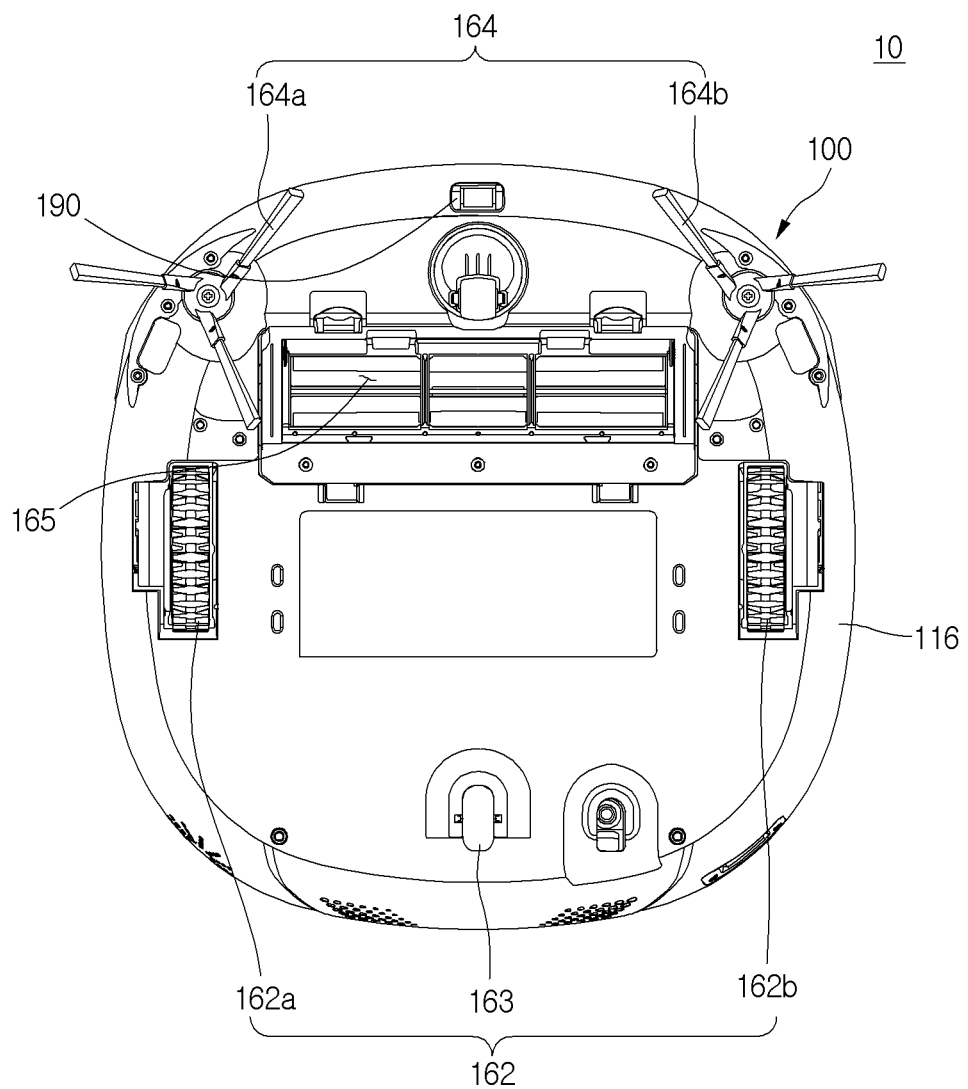
FIG. 2 is a bottom view of the robot cleaner according to the first embodiment.

FIG. 1 is a perspective view of a robot cleaner according to a first embodiment, and FIG. 2 is a bottom view of the robot cleaner according to the first embodiment.

Referring to FIGS. 1 and 2, a robot cleaner 10 according to the current embodiment may include a main body 100 defining an outer appearance thereof, an input unit 120 for receiving predetermined information, an output unit 150 for outputting the predetermined information, a moving unit 162 for moving the robot cleaner 10, and a cleaning unit 164 for performing cleaning.

The main body 100 may include a top surface part 112 constituting an upper portion of the robot cleaner 10, a side surface part 114 constituting a side surface of the robot cleaner 10, a bottom surface part 116 constituting a lower portion of the robot cleaner 10.

The input unit 120 may be disposed on the top surface part 112 of the main body 100, but the present disclosure is not limited thereto.

The input unit 120 may include a button or a touch panel. A user may turn the robot cleaner 10 on or off or select a cleaning mode or traveling mode through the input unit 120.

The main body 100 may include a receiving unit 131 for receiving a voice command, a camera 133 for collecting visual information with respect to surrounding environments, and an object detection sensor 134 for detecting whether an object exists.

The receiving unit 131 may include, for example, a microphone. The receiving unit 131 may be provided in plurality on the top surface part 112 of the main body 100. A direction in which a detected voice command occurs may be detected by using the plurality of receiving units 131.

In detail, distances from a sound source to the plurality of receiving units 131 may be different from each other. Thus, times taken to transmit a voice command occurring at a specific point to the receiving units 131 and levels of transmitted sounds may be different from each other. The direction in which the voice command occurs may be detected by using a difference of times at which the same voice commands are detected and a sound level.

The receiving unit 131 may include a first receiving unit 131a, a second receiving unit 131b, and a third receiving unit 131c which are disposed on an edge of the top surface part 112. Also, the first, second, and third receiving units 131a, 131b, and 131c are spaced apart from each other.

For example, the first, second, and third receiving units 131a, 131b, and 131c may be disposed on one circumference. Here, an angle between the microphones may be approximately 120° with respect to a center of a corresponding circle. That is, a virtual line connecting the first, second, and third receiving units 131a, 131b, and 131c to each other may have a triangular shape.

However, the current embodiment is not limited to the position and number of receiving units 131.

The direction may be accurately detected by using more microphones. Alternatively, the direction may be detected by using only two microphones. (For example, this is like that a direction of sound is detected through both ears of the person. Here, a structure such as an ear auricle for measuring turbidity of sound may be further provided.)

The camera 133 may be disposed on the top surface part 112 of the main body 100, but the present disclosure is not limited thereto.

The camera 133 may be disposed to face an upper or front side to photograph the surroundings of the robot cleaner 10. When the camera 133 is provided in plurality, the cameras 133 may be disposed on a top or side surface of the robot cleaner at a predetermined distance or angle.

The camera 133 may be used as a unit for detecting a position. For example, information photographed by using the camera 133 may be compared to map information of an area in which the robot cleaner 10 is located to detect a position of the robot cleaner 100.

At least one object detection sensor 134 may be disposed on the side surface part 114 or the bottom surface part 116 of the main body 100.

The object detection sensor 134 may detect an object (obstacle) or person around the robot cleaner 10. The object detection sensor 134 may detect whether an object or person exists within a preset distance. The preset distance may be decided according to whether the robot cleaner 10 is easily moved or switched in direction. An ultrasonic sensor, an infrared sensor, a radio frequency (RF) sensor, and a bumper may be used as the object detection sensor 134.

The output unit 150 may be disposed on a center of the top surface part 112 of the main body 100, but the present disclosure is not limited thereto.

The output unit 150 may include a speaker 151 for outputting sounds and a display 152 for outputting characters, figures, pictures, or symbols. The output unit 150 may include a light emitting diode for outputting predetermined information through whether light is emitted, a light color, a light emitting interval, or a light emitting pattern.

The moving unit 162 may include a plurality of wheels. The moving unit 162 may be disposed on a central portion of the bottom surface part 116 of the main body 100, but the present disclosure is not limited thereto.

For example, the moving unit 162 may include a first wheel 162a disposed on a left center of the bottom surface part 116 and a second wheel 162b disposed on a right center of the bottom surface part 116 when viewed in FIG. 1.

The first and second wheels 162a and 162b may be simultaneously or separately operated. When the first and second wheels 162a and 162b are operated in the same direction and at the same rate, the robot cleaner 10 may be moved forward or backward. Also, when the first and second wheels 162a and 162b are operated in different directions or at different rates, the robot cleaner 10 may be moved while being switched in direction. When the first and second wheels 162a and 162b are operated in different directions and at the same rate, the robot cleaner 10 may be rotated in place. That is, the first and second wheels 162a and 162b may be controlled in operation to switch only a direction of the robot cleaner 10.

When the moving unit 162 includes two wheels, an auxiliary wheel 163 may be further provided on the bottom surface part 116. The robot cleaner 10 may be stably moved by the two wheels 162a and 162b and the auxiliary wheel 163.

The auxiliary wheel 163 may be automatically rotated through a driving source or be manually rotated by friction force with a floor, which occurs while the robot cleaner 10 is moved.

Although each of the first and second wheels 162a and 162b is provided as a wheel having a circular plate shape, the present disclosure is not limited to a shape of the moving unit 162. For example, the moving unit 162 may have a wheel having a ball shape or a belt.

The cleaning unit 164 may be disposed on the bottom surface part 116 of the main body 100, but the present disclosure is not limited thereto.

The cleaning unit 164 may include a brush for sweeping dusts up, a steam generation part for generating steam, a spray part for spraying detergent, and a rag for cleaning dusts or water.

For example, the cleaning unit 164 may include a first brush 164a disposed on a left upper portion of the bottom surface part 116 and a second brush 164b disposed on a right upper portion of the bottom surface part 116 when viewed in FIG. 2.

The first and second brushes 164a and 164b may be rotated by a motor. The first and second brushes 164a and 164b may be rotated to sweep dusts around the robot cleaner 10 toward a suction hole.

In detail, when viewed in FIG. 2, the first brush 164a may be rotated in a clockwise direction, and the second brush 164b may be rotated in a counterclockwise direction. In this case, the first and second brushes 164a and 164b may sweep the dusts around the robot cleaner 10 toward lower sides of the first and second brushes 164a and 164b.

When the cleaning unit 164 includes a brush, a dust suction hole 165 for suctioning the dusts swept by the brush may be defined in the bottom surface part 116. When viewed in FIG. 2, the dust suction hole 165 may be defined in a rear side of a rotation center of each of the first and second brushes 164a and 164b. Also, the dust suction hole 165 may be disposed in a front side of a rotation center of each of the first and second wheels 162a and 162b.

The main body 100 may include a charging unit 190. The charging unit 190 of the robot cleaner 10 may be connected to a terminal of a charging platform (see reference numeral 50 of FIG. 7) so that the robot cleaner 10 receives power from the charging platform 50.

Also, to detect whether the robot cleaner 10 is connected to the charging platform 50, a charging position detection unit (not shown) may be further provided on the main body 10 or the charging platform (not shown). For example, the charging position detection unit may be a button having elasticity. The button may be pushed when the main body 10 is disposed at a charging position. On the other hand, when the main body 10 gets out of the charging position, the button may return to its original state. Also, only when the button is pushed, power may be transmitted from the charging platform 50 to the robot cleaner 10.

Figure 3:
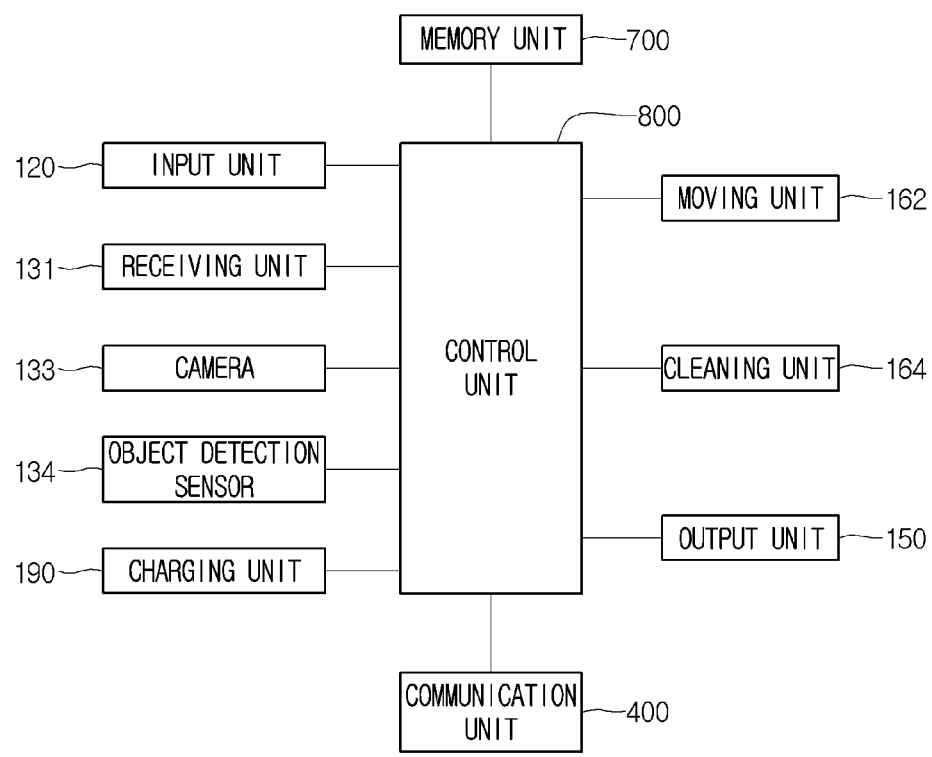
FIG. 3 is a block diagram of the robot cleaner according to the first embodiment.

FIG. 3 is a block diagram of the robot cleaner according to the first embodiment.

Referring to FIG. 3, the robot cleaner 10 according to the current embodiment may include a voice recognition unit 310 for recognizing a user's voice, a direction detection unit 320 for detecting a direction in which a voice occurs, a position detection unit 330 for detecting a position of the main body 100, a communication unit 400 for communicating with a remote control device or other devices, a driving unit 600 for driving the moving unit 162 or cleaning unit 164 of the main body 100, and a memory unit 700 for storing information. The input unit 120, the objection detection sensor 134, a charging unit 190, the voice recognition unit 310, the direction detection unit 320, the position detection unit 330, the communication unit 400, the output unit 150, the driving unit 600, and the memory unit 700 may be connected to a control unit 800 to transmit or receive predetermined information to/from the control unit 800.

The voice recognition unit 310 may compare a voice inputted through the receiving unit 131 to the information stored in the memory unit 700 to determine whether the inputted voice corresponds to a specific command. If it is determined that the inputted voice corresponds to the specific command, the corresponding command is transmitted into the control unit 800. If it is impossible to compare the detected voice to the information stored in the memory unit 700, the detected voice may be regarded as noise to ignore the detected voice.

For example, the detected voice corresponds to a word "come on", and there is a control command corresponding to the word "come on" of the information stored in the memory unit 700. In this case, the corresponding command may be transmitted into the control unit 800.

The direction detection unit 320 may detect a direction of the voice by using a time difference or level of the voice inputted into the plurality of receiving units 131. The direction detection unit 320 transmits the direction of the detected voice to the control unit 800. The control unit 800 may determine a moving path by using the voice direction detected by the direction detection unit 320.

The position detection unit 330 may detect a coordinate of the main body 100 within predetermined map information. For example, the information detected by the camera 133 and the map information stored in the memory unit 700 may be compared to each other to detect the current position of the main body 100. The position detection unit 330 may use a global positioning system (GPS) in addition to the camera 133.

In a broad sense, the position detection unit 330 may detect whether the main body 100 is disposed at a specific position. For example, the position detection unit 330 may include a unit for detecting whether the main body 100 is disposed on the charging platform 50.

For example, in a method for detecting whether the main body 100 is disposed on the charging platform 50, whether the main body 100 is disposed at the charging position may be detected according to whether power is inputted into the charging unit 190. For another example, whether the main body 100 is disposed at the charging position may be detected by a charging position detection unit disposed on the main body 100 or the charging platform 50.

The communication unit 400 may transmit or receive predetermined information into/from a remote control device or other devices. The communication unit 400 may update the map information of the robot cleaner 10.

The driving unit 600 may operate the moving unit 162 and the cleaning unit 164. The driving unit 600 may move the moving unit 162 along the moving path determined by the control unit 800.

The memory unit 700 stores predetermined information related to the operation of the robot cleaner 100. For example, map information of an area on which the robot cleaner 10 is disposed, control command information corresponding to the voice recognized by the voice recognition unit 310, direction angle information detected by the direction detection unit 310, position information detected by the position detection unit 330, and obstacle information detected by the object detection sensor 134 may be stored in the memory unit 700.

Figure 4:
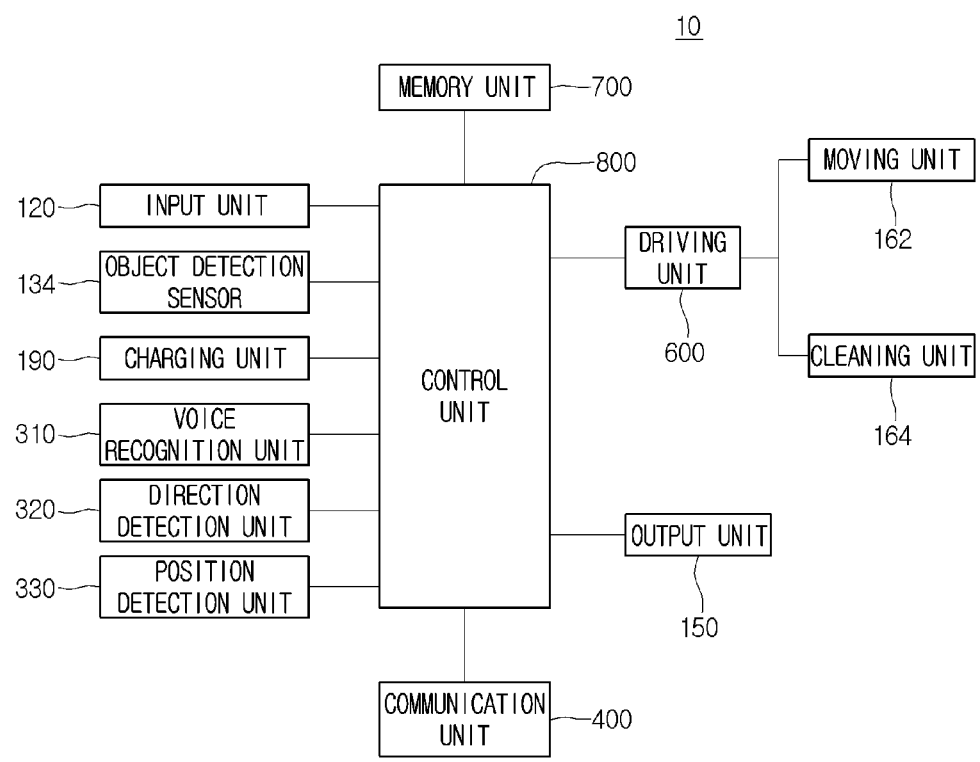
FIG. 4 is a block diagram of a robot cleaner according to a second embodiment.

FIG. 4 is a block diagram of a robot cleaner according to a second embodiment. Duplicated descriptions with respect to those of FIG. 3 will be omitted.

Referring to FIG. 4, the control unit 800 may receive information detected by the receiving unit 131, the camera 133, and the object detection sensor 134. The control unit 800 may recognize a user's voice, detect a direction in which the voice occurs, and detect a position of the robot cleaner 10 on the basis of the transmitted information. Also, the control unit 800 may operate the moving unit 162 and the cleaning unit 164.

That is, although the voice recognition unit 310, the direction detection unit 320, the position detection unit 330, and the driving unit 600 are separated from the control unit 800 in FIG. 3, it is not necessary to separate the above-described units 310, 320, 330, and 600 from the control unit 800. As shown in FIG. 4, the control unit 800 may serve as the voice recognition unit 310, the direction detection unit 320, the position detection unit 330, and the driving unit 600.

Figure 5:
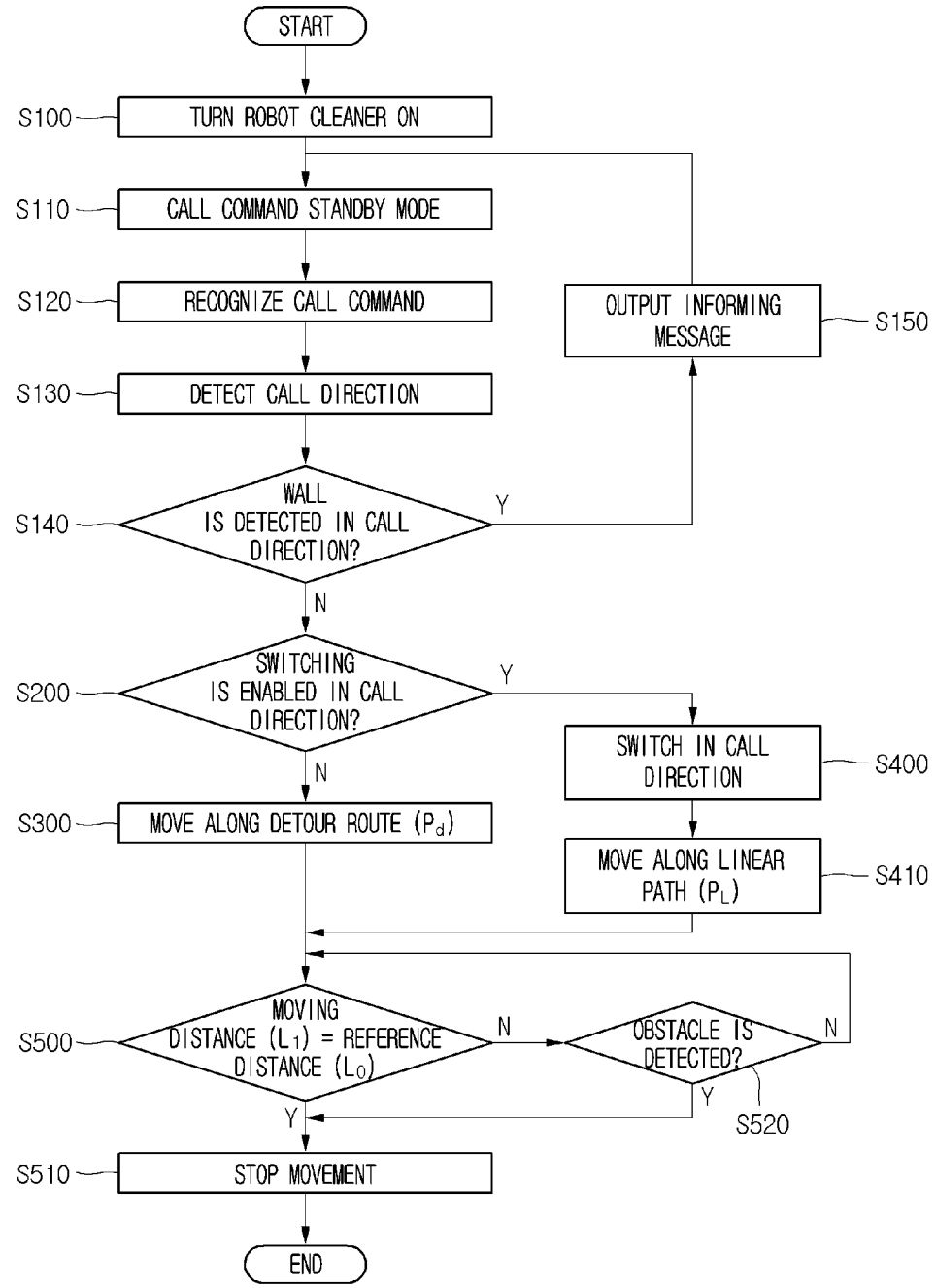
FIG. 5 is a flowchart illustrating a method for controlling the robot cleaner according to the first embodiment.

FIG. 5 is a flowchart illustrating a method for controlling the robot cleaner according to the first embodiment.

Referring to FIG. 5, to operate the robot cleaner 10, the robot cleaner 10 is turned on (S100). Then, the robot cleaner 10 is in a call command standby mode for a user (S110).

When a voice recognized by the voice recognition unit 310 and the control command information stored in the memory unit 700 are compared to each other to determine that the voice corresponds to a call command (S120), the robot cleaner 10 detects a direction angle $\theta$, at which the voice occurs, through the direction detection unit 320.

Then, it is determined to whether a wall exists in the call direction by using a wall detection unit (S140). For example, when the object detection sensor 134 detects a continuous obstacle at the direction angle $\theta$, it may be determined that the wall exists in the call direction. For another example, when the position detected by the position detection unit 330 is within a predetermined distance, and the wall is disposed at the direction angle $\theta$, it may be determined that the wall exists in the call direction.

When the call direction corresponds to a direction facing or passing through the wall, an informing message for informing irremovableness is outputted (S150). The informing message may be informed by using sounds or characters through the speaker 151 or the display 152.

When the wall exists is disposed at the direction angle $\theta$, it may be assumed that a voice of a caller is reflected by the wall and then inputted. Thus, the informing message may be a voice message meant "not movable due to echo".

When the wall exists in the call direction, whether the main body 100 is switchable in the call direction is determined through the detection unit (S200).

For example, if the main body 100 is disposed at the charging position, the robot cleaner 10 may not be switchable in direction. Thus, whether the main body 100 is switchable in direction may be determined according to whether the main body 100 detected by the position detection unit 330 is disposed at the charging position.

For another example, when the main body 100 is caught at the obstacle or wall therearound, the robot cleaner 10 may not be switchable in direction according to an outer appearance of the main body 100. Thus, whether the main body 100 is switchable in direction may be determined according to whether the robot cleaner 10 is stopped while being switched in direction.

For another example, even thought the robot cleaner 10 is not stopped, whether the main body 100 is switchable in direction may be determined according to whether an obstacle interfering with the direction switching exists while being switched in direction. Whether the obstacle exists may be determined through the object detection sensor 134.

When the robot cleaner 10 is not switchable in the call direction, the robot cleaner 10 may be moved along a detour route Pd. The detour route Pd of the robot cleaner 10 will be described in detail with reference to FIGS. 6 to 12.

If the main body 100 is not switched in the call direction, the robot cleaner 10 may be switched in direction at the direction angle $\theta$ in place. Also, the main body 100 may be movable along a liner path PL toward the call direction.

When the robot cleaner 10 is moved along the detour route Pd or the linear path PL, a moving distance L1 of the robot cleaner 10 is measured. Then, it is determined whether the moving distance L1 reaches a preset reference distance L0 (S500).

When the moving distance L1 reaches the reference distance L0, the robot cleaner 10 is stopped (S510) to stop the movement in the call direction.

When the moving distance L1 does not reach the reference distance L0, it is detected whether an obstacle (an object or person) exists in a linear direction of the robot cleaner 10 (S520).

When the robot cleaner 10 detects the obstacle, it is recognized that a caller (a person speaking the call command) exists within the reference distance L0. Thus, the robot cleaner 10 may be stopped (S510). Also, the movement of the robot cleaner 10 in the call direction is ended.

When the caller is not detected in the moving direction of the robot cleaner 10, the process returns to the operation S500. The operations S500 and S520 may be out of order.

Figure 6:
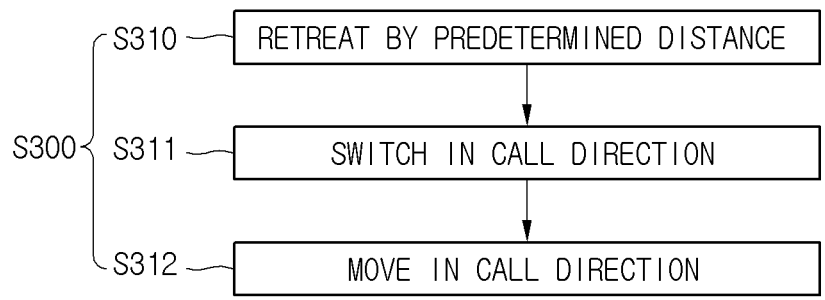
FIG. 6 is a flowchart illustrating movement along a detour route Pd according to the first embodiment.

FIG. 6 is a flowchart illustrating movement along the detour route Pd according to the first embodiment.

Referring to FIG. 6, the moving process (S300) along the detour route Pd according to the current embodiment may include a process (S310) in which the robot cleaner 10 retreats by a predetermined distance along a first detour route, a process (S311) in which the robot cleaner 10 is switched in the call direction, and a process (S312) in which the robot cleaner 10 is moved in the call direction along a second detour route.

Figure 7:
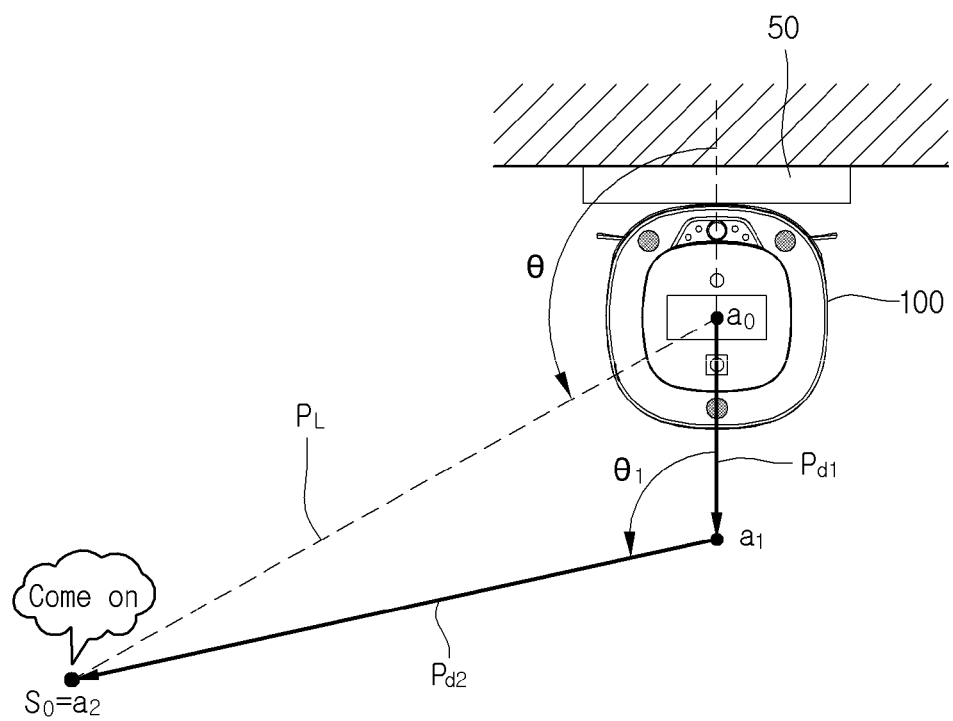
FIG. 7 is a view for explaining a moving operation along the detour route Pd according to the first embodiment.

FIG. 7 is a view for explaining a moving operation along the detour route Pd according to the first embodiment.

FIG. 7 illustrates an operation of the robot cleaner 10 when a call command is recognized in the state where the robot cleaner 10 is disposed at the charging position.

In detail, if a call command occurs, the robot cleaner 10 detects a direction angle $\theta$ from an initial position a0 at which the call command is recognized to a position s0 of the caller. Also, it is determined whether the robot cleaner 10 is movable along a linear path PL from the initial position a0 to the position s0 of the caller. "The initial position a0" may be understood as "the current position" with respect to a time point at which the robot cleaner 10 recognizes the call command.

When the initial position a0 corresponds to the charging position, the robot cleaner 10 is not switchable in direction. In this case, the control unit 800 may set the detour route Pd by using the distance between the initial position a0 to the position s0 of the caller and the direction angle $\theta$. The detour route Pd may include a first detour route Pd1 that gets out of the charging position and a second detour route Pd2 along which the robot cleaner 10 is moved in the call direction.

First, the robot cleaner 10 may be moved along the first detour route Pd1 and thus go out of the initial position a0. Then, the robot cleaner 10 is moved up to a first position a1 at which the robot cleaner 10 is switchable in direction. The first detour route Pd1 may be a retreating direction of the robot cleaner 10. Also, a retreating distance may be preset.

When the robot cleaner 10 is disposed at the first position a1, the robot cleaner 10 may be switched in direction of the caller (hereinafter, referred to as a "switching angle θ1") with respect to the first position a1.

Since the call command is recognized when the robot cleaner 10 is disposed at the charging position, the control unit 800 may calculate the switching angle θ1 by using the distance between the initial position a0 to the caller s0, the direction angle θ, and a distance from the initial position a0 to the first position a1.

The distance from the initial position a0 to the caller s0 may be determined by using information collected through a distance measuring sensor such as the camera or ultrasonic sensor. If the distance measuring sensor is not provided, and thus the distance from the initial position a0 to the caller s0 is not determined, the switching angle θ1 may be calculated by assuming a predetermined distance.

When the switching to the switching angle θ1 is completed, the robot cleaner 10 may be moved straight along the second retour route Pd1 and then moved up to the second position a2.

Figure 8:
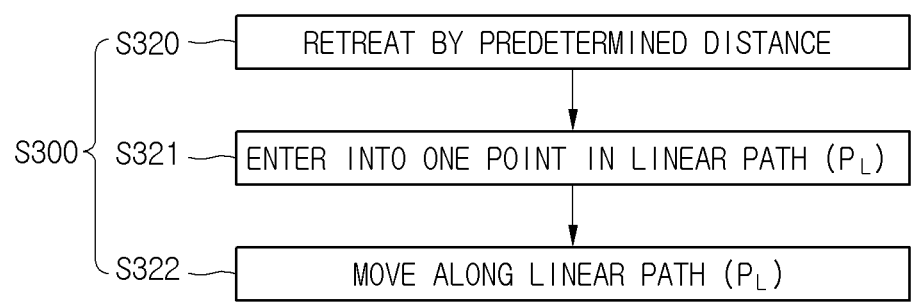
FIG. 8 is a flowchart illustrating movement along a detour route Pd according to third and fourth embodiments.

FIG. 8 is a flowchart illustrating movement along a detour route Pd according to third and fourth embodiments.

Referring to FIG. 8, a moving process (S300) along a detour route Pd according to a third embodiment may include a process (S320) in which a robot cleaner 10 retreats by a predetermined distance along a first detour route, a process (S321) in which the robot cleaner 10 enters into one point in a linear path PL along a second retour route, and a process (S322) in which the robot cleaner 10 is moved into the linear path PL along a third retour route.

Figure 9:
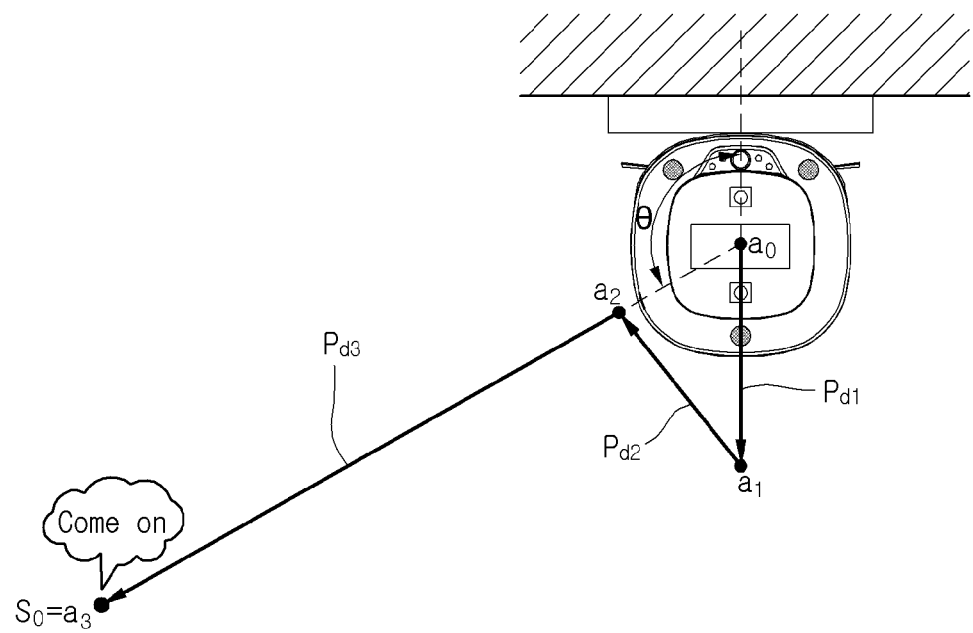
FIG. 9 is a view for explaining a moving operation along the detour route Pd according to the third embodiment.
Figure 10:
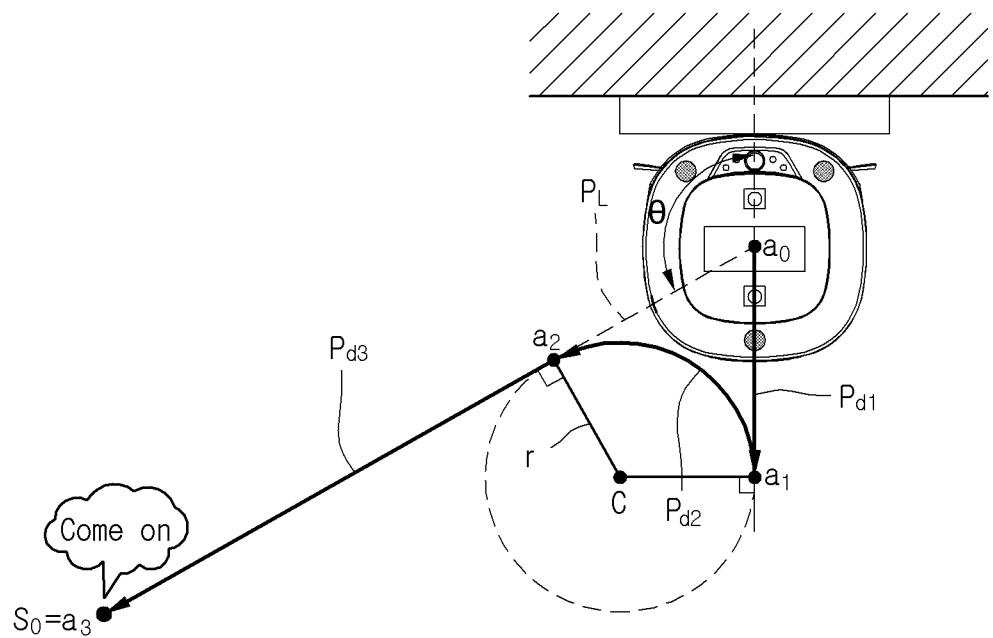
FIG. 10 is a view for explaining a moving operation along the detour route Pd according to the fourth embodiment.

FIG. 9 is a view for explaining a moving operation along the detour route Pd according to the third embodiment, and FIG. 10 is a view for explaining a moving operation along the detour route Pd according to the fourth embodiment. FIG. 9 illustrates an operation of the robot cleaner 10 when a call command is recognized in a state where the robot cleaner 10 is disposed at a charging position. Duplicated descriptions with respect to those described in the first embodiment will be omitted.

When an initial position a0 of the robot cleaner 10 corresponds to a charging position, the robot cleaner 10 is not switchable in direction. In this case, the robot cleaner 10 is moved along a first detour route Pd1 and thus goes out of the initial position a0. Then, the robot cleaner 10 is moved up to a first position a1 at which the robot cleaner 10 is switchable in direction. The first detour route Pd1 may be a route along which the robot cleaner 10 retreats.

After the robot cleaner 10 is disposed at the first position a1, the robot cleaner 10 is moved up to a second position a2 along a second detour route Pd2. Here, the second position a2 may be one point in a linear path PL.

The second detour route Pd2 may be a linear line (the first embodiment) or curved line (the third embodiment).

According to the third embodiment, the second detour route Pd2 may be a linear path from the first position a1 to the second position a2.

The robot cleaner 10 is rotated at a predetermined angle at the first position a1 and then aligned so that a front side of the robot cleaner 10 faces the second position a2. Also, when the robot cleaner 10 reaches the second position a2, the robot cleaner 10 is rotated again at a predetermined angle and then aligned in a direction of the linear path PL. Then, the robot cleaner 10 is moved forward to reach a third position a3 along a third detour route pd3.

According to a fourth embodiment, a second detour route Pd2 may be a curved path from a first position a1 to a second position a2. If first and second wheels 162 and 162b are adjusted in number of revolution per unit time (RPM), the robot cleaner 10 may be moved along the curved path.

The second detour route Pd2 may be a portion of an oval, parabola, or circular that contacts the first detour route Pd1 and the linear path PL.

For example, the second detour route Pd2 may be a portion of a circle that contacts the first detour route Pd1 and the linear path PL.

In detail, a center point c of a circle including the second detour route Pd2 may be set. Here, a normal line extending from the center point c to the first detour route Pd1 may be disposed at the first position a1, and a normal line extending from the center point c to the linear path PL may be disposed at the second position a2.

In this case, a path near a starting point of the second detour route Pd2 contacts the first detour route Pd1. In this case, when the robot cleaner 10 start at the first position a1, a moving direction of the robot cleaner 10 may coincide with a direction of the second detour route Pd2. Thus, it may be unnecessary to previously switch a direction of the robot cleaner 10 that starts at the first position a1, and also, the robot cleaner 10 may be moved along the second detour route Pd2. In detail, the first and second wheels 162 and 162b may be adjusted in number of revolution to enter into the second position a2.

Similarly, a path near an arriving point of the second detour route Pd2 contacts the linear path PL. In this case, when the robot cleaner 10 enters into the second position a2, a moving direction of the robot cleaner 10 may coincide with a direction of the linear path PL. Thus, it may be unnecessary to previously switch a direction of the robot cleaner 10 that starts at the second position a2, and also, the robot cleaner 10 may be moved along the third detour route Pd3 corresponding to a portion of the linear path PL.

Figure 11:
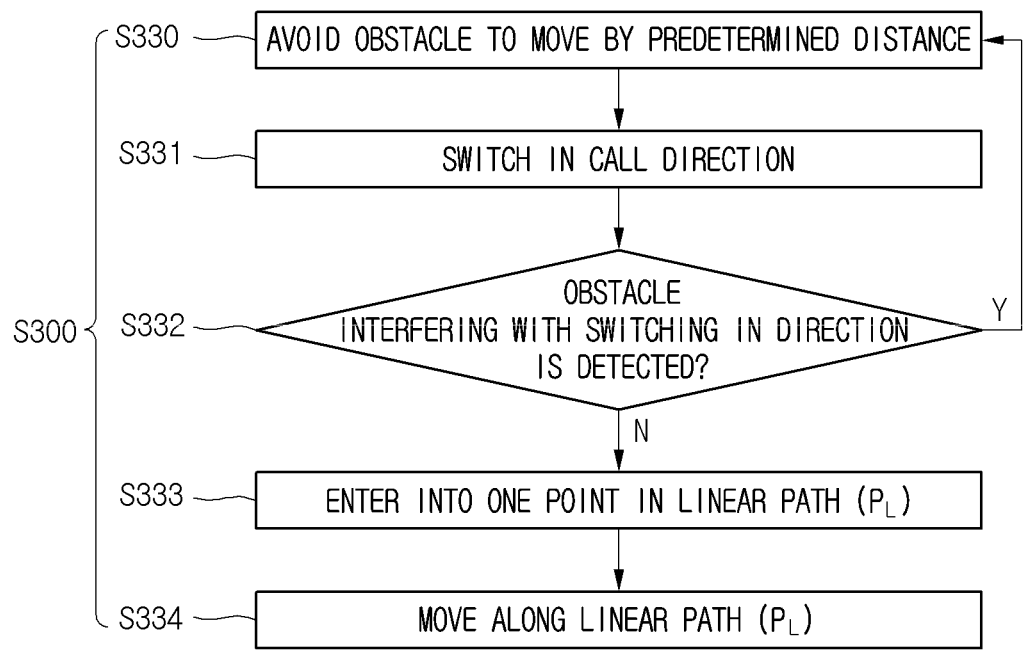
FIG. 11 is a flowchart illustrating movement along a detour route Pd according to a fifth embodiment.

FIG. 11 is a flowchart illustrating movement along a detour route (Pd) according to a fifth embodiment.

Referring to FIG. 11, a moving process (S300) along a detour route Pd according to a fifth embodiment may include a process (S330) in which a robot cleaner 10 is moved by a predetermined distance along a first detour route to avoid an obstacle, a process (S331) in which the robot cleaner 10 is switched in a call direction, a process (S332) of detecting an obstacle interfering with the switching in direction, a process (S333) of entering into one point on a linear path PL from an initial position to a caller along a second detour route, and a process (S334) in which the robot cleaner is moved into the linear path PL along a third retour route.

When an obstacle interfering with the switching in direction is detected in the operation S332, the process returns to the operation S330.

Whether the obstacle interfering with the switching in direction exists may be determined whether the main body 100 is rotated at a direction angle θ.

Also, whether the obstacle interfering with the switching in direction exists may be determined according to information recognized by an object detection sensor 134 for detecting an obstacle around the main body 100. In this case, it is seen whether the robot cleaner 10 is switchable in direction before the robot cleaner 10 is switched in an actual call direction, the operation S331 may be omitted.

When the obstacle interfering with the switching in direction is not detected in the operation S332, the operation S333 and S334 are performed.

Figure 12:
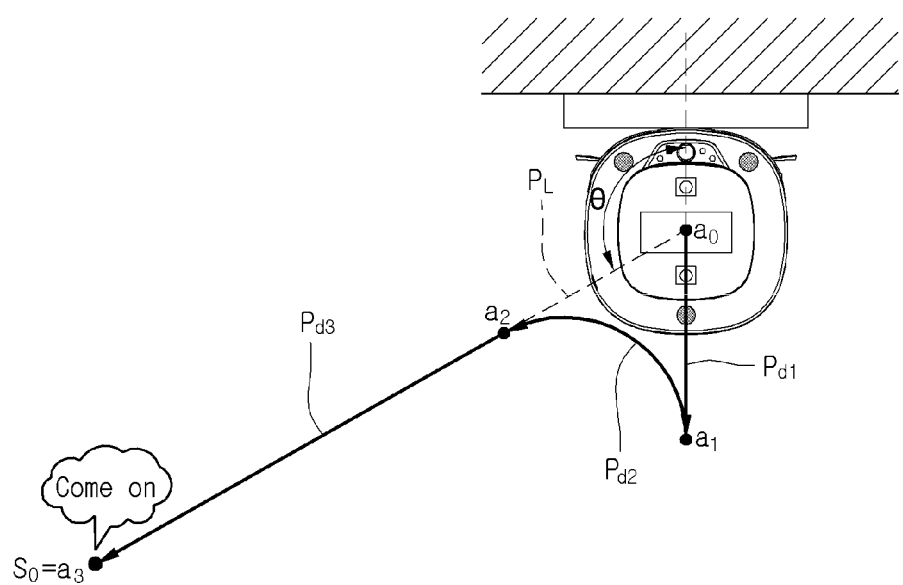
FIG. 12 is a view for explaining a moving operation along the detour route Pd according to the fifth embodiment.

FIG. 12 is a view for explaining a moving operation along the detour route (Pd) according to the fifth embodiment.

FIG. 12 illustrates an operation when a call command is recognized in the state where a robot cleaner 10 is disposed adjacent to a wall at which it is difficult to switch a direction of the robot cleaner 10.

Referring to FIG. 12, if a call command occurs, the robot cleaner 10 detects a direction angle θ from an initial position a0 at which the call command is recognized to a position a0 of a caller. Also, it is determined whether the robot cleaner 10 is switchable in the direction angle θ.

If the robot cleaner 10 is not switchable in direction, the robot cleaner 10 may be moved along a first detour route Pd1 and thus go out of an initial position a0. Then, the robot cleaner 10 is moved up to a first position a1 at which the robot cleaner 10 is switchable in direction.

The first detour route Pd1 may be determined by map information stored in a memory unit 700 or map information transmitted by a communication unit 400. The robot cleaner 10 may set the first position a1 at which a sufficient space for switching is secured and then be moved up to the first position a1 along a linear or curved path on the basis of the map information.

Also, the first detour route Pd1 may be a route along the robot cleaner 10 is moved through a try and error method. That is, the first detour route Pd1 may be a route along which the robot cleaner 10 is moved to the first position a1 at which a sufficient space for switching is secured while repeatedly going out of the current position.

The process in which the robot cleaner 10 is moved from the first position a1 to the second and third positions a2 and a3 is the same those of FIGS. 9 and 10, and thus their detailed descriptions will be omitted.

When a preset voice command is detected, the robot cleaner according to the embodiments may detect a direction in which the voice command occurs and then be moved up to a corresponding position. That is, the user may call the robot cleaner by using the voice thereof without the need of a separate calling unit.

Also, even though the robot cleaner is not switchable in direction, the robot cleaner may set a detour route by oneself and then be moved to the call position.

Also, if a call direction is not detected, or the robot cleaner is not movable in the call direction, the informing message may be outputted. Thus, there is an advantage that user's sensibility dissatisfaction occurring by mistaking the robot cleaner as the broken robot cleaner can be solved.

In the robot cleaner according to the embodiments, when the preset voice command is detected, the robot cleaner may detect a direction in which the voice command occurs and then be moved up to a corresponding position. That is, the user may call the robot cleaner by using the voice thereof without the need of a separate calling unit.

Also, even though the robot cleaner is not switchable in direction, the robot cleaner may set the detour route by oneself and then be moved to the call position.

Also, if the call direction is not detected, or the robot cleaner is not movable in the call direction, the informing message may be outputted. Thus, there is an advantage that user's sensibility dissatisfaction occurring by mistaking the robot cleaner as the broken robot cleaner can be solved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
   a main body comprising a receiving unit;
   a moving unit to move the main body;
   a control unit to control the moving unit;
   a voice recognition unit to analyze a pattern of a voice command inputted into the receiving unit to detect whether a call command is inputted;
   a direction detection unit to detect a direction in which the call command occurs; and
   a detection unit to determine whether the main body is rotatable in the call command occurring direction at a position at which the main body is disposed when the voice command occurs,
   wherein the control unit is configured to set a linear path (PL) from an initial position (a0) of the main body to a position (s0) of a caller when a call command is inputted,
   the control unit is configured to determine that the main body is not rotatable in the call command occurring direction when the robot cleaner is docked to a charging platform,
   wherein, when the main body is not movable in the voice command occurring direction, the main body controls the moving unit so that the main body goes out of the initial position (a0) and moves along a detour route (Pd),
   after moving along the detour route (Pd), the main body enters into one point in the linear path (PL) to move to the position (s0) of a caller.

2. The robot cleaner according to claim 1, wherein the detour route (Pd) comprises:
   a first detour route (Pd1) along which the main body is moved up to a first position (a1) spaced apart from the initial position (a0) of the main body; and
   a second detour route (Pd2) along which the main body is moved from the first position (a1) to a second position (a2) that is one point in the linear path (PL).

3. The robot cleaner according to claim 2, wherein the second detour route (Pd2) is a linear line.

4. The robot cleaner according to claim 2, wherein the second detour route (Pd2) is a curved line, and
   the control unit controls the moving unit so that the main body retreats from the initial position (a0) of the main body to move up to the first position (a1) and is forwardly moved and switched in direction from the first position (a1) at the same time to move up to the second position (a2).

5. The robot cleaner according to claim 4, wherein the moving unit comprises:
   a first wheel disposed on one side of the main body; and
   a second wheel disposed on the other side of the main body,
   wherein the first wheel has a rotating rate different from that of the second wheel.

6. The robot cleaner according to claim 1, wherein the control unit controls the moving unit so that the main body is rotated in a voice occurring direction and moved from an initial position (a0) of the main body to a position (s0) of a caller along a linear path (PL) when the main body is movable in the voice command occurring direction at a position at which the main body is disposed.

7. A method for controlling a robot cleaner, the method comprising:
- receiving a voice command of a user through a receiving unit of the robot cleaner;
- detecting a direction of a call position at which the voice command occurs;
- detecting a current position of the robot cleaner;
- setting a linear path (PL) from the current position of the robot cleaner to the call position;
- determining whether the robot cleaner is movable from the current position in the direction of the call position along a linear path (PL);
- moving the robot cleaner in the direction of the call position along a preset detour route when the robot cleaner is not movable along the linear path (PL);
- entering the robot cleaner the linear path (PL); and
- ending the movement of the robot cleaner in the call position direction,
- wherein it is determined that the robot cleaner is not rotatable and not movable in the linear path (PL) in the call position direction when the robot cleaner is docked to a charging platform.

8. The method according to claim 7, wherein the detour route comprises:
- a first route going out of an initial position; and
- a second detour route entering into the linear path (PL).

9. The method according to claim 7, wherein
- when the robot cleaner detects a user while being moved, the robot cleaner ends a movement or
- when the robot cleaner reaches a preset moving distance, the robot cleaner ends a movement.

10. The robot cleaner according to claim 1, wherein the detection unit comprises a position detection unit to detect a position of the main body.

11. The robot cleaner according to claim 10, further comprising a camera to photograph surrounding environments of the main body,
wherein the position detection unit compares information of the surrounding environments photographed by the camera to previously stored map information to detect the position of the main body.

12. The robot cleaner according to claim 1, further comprising at least one object detection sensor to detect whether an obstacle exists around the main body,
wherein the detection unit detects whether the obstacle detected by the object detection sensor interferes with rotation of the main body.

13. The robot cleaner according to claim 1, wherein when the voice command occurring direction corresponds to a direction facing or passing through a wall, a preset informing message is outputted.

* * * * *